US010920590B2

(12) United States Patent
Lipkin et al.

(10) Patent No.: US 10,920,590 B2
(45) Date of Patent: Feb. 16, 2021

(54) TURBINE ASSEMBLY MAINTENANCE METHODS

(71) Applicant: GENERAL ELECTRIC COMPANY, Schenectady, NY (US)

(72) Inventors: Don Mark Lipkin, Niskayuna, NY (US); Todd William Danko, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 122 days.

(21) Appl. No.: 15/198,754

(22) Filed: Jun. 30, 2016

(65) Prior Publication Data

US 2018/0003060 A1   Jan. 4, 2018

(51) Int. Cl.
*B23P 6/00* (2006.01)
*B23P 6/04* (2006.01)
*F01D 5/00* (2006.01)
*F01D 25/28* (2006.01)
*F01D 5/02* (2006.01)

(52) U.S. Cl.
CPC .............. *F01D 5/005* (2013.01); *B23P 6/002* (2013.01); *B23P 6/045* (2013.01); *F01D 5/02* (2013.01); *F01D 25/285* (2013.01); *F05D 2220/32* (2013.01); *F05D 2230/72* (2013.01); *F05D 2230/80* (2013.01); *Y02T 50/60* (2013.01)

(58) Field of Classification Search
CPC .......... F01D 5/005; F01D 5/02; F01D 25/285; B23P 6/045; B23P 6/002; Y02T 50/672; F05D 2220/32; F05D 2230/80; F05D 2230/72

See application file for complete search history.

(56) References Cited

U.S. PATENT DOCUMENTS 4,298,312 A * 11/1981 MacKenzie ........ G02B 23/2476
385/118
4,649,858 A   3/1987 Sakai et al.
(Continued)

FOREIGN PATENT DOCUMENTS

CN       103511005 A    1/2014
DE   10 2011 122759 A1   5/2013
(Continued)

OTHER PUBLICATIONS

International Search Report and Written Opinion issued in connection with corresponding PCT Application No. PCT/WO/US17/37592 dated Sep. 15, 2017.
(Continued)

*Primary Examiner* — Rick K Chang
(74) *Attorney, Agent, or Firm* — Dority & Manning, P.A.

(57) ABSTRACT

The present invention is directed to in situ methods for maintaining turbine assemblies. One such method includes: disposing a maintenance apparatus on the rotor; positioning the maintenance apparatus proximate to the damaged region by rotating the rotor; and repairing the damaged region by operating a repair tool disposed on the apparatus. Another method includes: disposing a maintenance apparatus on the stator; positioning the damaged region proximate to the maintenance apparatus by rotating the rotor; and repairing the damaged region by operating a repair tool disposed on the apparatus.

9 Claims, 3 Drawing Sheets

(56) References Cited

U.S. PATENT DOCUMENTS

| | | | |
|---|---|---|---|
| 5,155,941 A * | 10/1992 | Takahashi | A61B 1/0051 408/16 |
| 5,644,394 A | 7/1997 | Owens | |
| 5,723,078 A | 3/1998 | Nagaraj et al. | |
| 5,759,932 A | 6/1998 | Sangeeta et al. | |
| 5,902,647 A | 5/1999 | Venkataramani et al. | |
| 5,985,368 A | 11/1999 | Sangeeta et al. | |
| 6,042,880 A | 3/2000 | Rigney et al. | |
| 6,074,706 A | 6/2000 | Beverley et al. | |
| 6,235,352 B1 | 5/2001 | Leverant et al. | |
| 6,335,078 B2 | 1/2002 | Venkataramani et al. | |
| 6,378,159 B1 | 4/2002 | Garrison et al. | |
| 6,413,578 B1 | 7/2002 | Stowell et al. | |
| 6,497,758 B1 | 12/2002 | Hasz et al. | |
| 6,605,160 B2 | 8/2003 | Hoskin | |
| 6,827,969 B1 | 12/2004 | Skoog et al. | |
| 6,875,464 B2 | 4/2005 | Ruud et al. | |
| 6,881,439 B2 | 4/2005 | Graham et al. | |
| 6,890,587 B2 | 5/2005 | Khan et al. | |
| 6,919,121 B2 | 7/2005 | Stowell et al. | |
| 7,008,522 B2 | 3/2006 | Boucard et al. | |
| 7,029,721 B2 | 4/2006 | Hasz et al. | |
| 7,093,993 B2 | 8/2006 | Skoog et al. | |
| 7,174,788 B2 * | 2/2007 | Czerw | G01N 29/265 73/620 |
| 7,476,703 B2 | 1/2009 | Ruud et al. | |
| 7,509,735 B2 * | 3/2009 | Philip | C23C 4/02 29/889.1 |
| 7,588,797 B2 | 9/2009 | Skoog et al. | |
| 7,611,781 B1 | 11/2009 | Kokubo et al. | |
| 7,829,196 B2 | 11/2010 | Kokubo et al. | |
| 7,842,335 B2 | 11/2010 | Skoog et al. | |
| 8,221,825 B2 | 7/2012 | Reitz et al. | |
| 8,400,501 B2 | 3/2013 | Heyworth et al. | |
| 8,563,080 B2 | 10/2013 | Hopkins | |
| 8,597,724 B2 | 12/2013 | Bunting et al. | |
| 9,085,053 B2 | 7/2015 | Tholen et al. | |
| 9,540,497 B2 | 1/2017 | Lipkin et al. | |
| 9,581,440 B2 | 2/2017 | Ruhge et al. | |
| 2003/0024430 A1 | 2/2003 | Hasz et al. | |
| 2003/0101587 A1 | 6/2003 | Rigney et al. | |
| 2005/0129868 A1 | 6/2005 | Philip et al. | |
| 2007/0202269 A1 | 8/2007 | Potter et al. | |
| 2009/0074576 A1 | 3/2009 | Brostmeyer | |
| 2009/0208662 A1 * | 8/2009 | Blankenship | C23C 4/02 427/451 |
| 2009/0297701 A1 | 12/2009 | Jabado et al. | |
| 2010/0237134 A1 | 9/2010 | Bucci et al. | |
| 2011/0206533 A1 | 8/2011 | Lee et al. | |
| 2012/0198676 A1 | 8/2012 | Rickenbacher et al. | |
| 2014/0259589 A1 | 9/2014 | Xu et al. | |
| 2014/0315029 A1 | 10/2014 | Roberts, III et al. | |
| 2014/0352483 A1 | 12/2014 | Robert, III et al. | |
| 2015/0174837 A1 | 6/2015 | Kolvick et al. | |
| 2015/0174838 A1 | 6/2015 | Kittleson et al. | |
| 2015/0175486 A1 | 6/2015 | Roberts et al. | |

FOREIGN PATENT DOCUMENTS

| | | |
|---|---|---|
| EP | 1172460 A2 | 1/2002 |
| EP | 2 008 756 A1 | 12/2008 |
| WO | 2013/064242 A2 | 5/2013 |
| WO | 2015073196 A1 | 5/2015 |
| WO | 2015082818 A1 | 6/2015 |

OTHER PUBLICATIONS

System and method for maintenance of a turbine assembly, GE Co-pending U.S. Appl. No. 15/290,130, filed Oct. 11, 2016.

K.J. Pallos, "Gas Turbine Repair Technology," GE Power Systems, GER-3975B, pp. 1-26.

C. Rinaldi, et al, "Epitaxial Repair and In Situ Damage Assessment for Turbine Blades," Journal of Power and Energy, Mar. 1, 2005, pp. 93-99, vol. 219, Issue 2.

Machine Translated Chinese Search Report Corresponding to Application No. 201780040826 dated Sep. 16, 2020.

* cited by examiner

TURBINE ASSEMBLY MAINTENANCE METHODS

FIELD OF THE INVENTION

The present invention is directed to in situ methods for maintaining turbine assemblies.

BACKGROUND OF THE INVENTION

Turbines for aircraft engines as well as gas and steam powered turbines for industrial applications comprise at least one rotor carrying multiple stages of airfoils (henceforth referred to as blades), which rotates with respect to the turbine case. In turn, the turbine case carries multiple stages of airfoils (henceforth referred to as guide vanes), such that the turbine consists of alternating stages of blades and guide vanes. To reduce leakage of air, steam, or combustion gas over the tips of the blades, shrouds can be disposed on the radially inner surfaces of the stator so as to form a ring seal around the blade tips. To limit air, steam, or combustion gas from entering the rotor cavities or wheel spaces, blades have platforms and guide vanes have inner sidewalls. Similarly, guide vanes have outer sidewalls to limit radially outward leakage. Together, the blades, guide vanes and shrouds define the primary flowpath inside the turbine.

During use, the turbine components can experience degradation. Periodic inspections, such as borescope inspections, are performed in order to assess the condition of the machine in-between service intervals. Examples of damage that can be observed during inspection include wear (e.g., from incursion of blade tips into the shrouds, particle-induced erosion, water droplet induced erosion, wear due to sliding contact between stationary components), impact (e.g., spallation of thermal or environmental barrier coating ("TBC" or "EBC", respectively) from turbine-section components, leading edge burring/bending of compressor blades), cracking (e.g., thermal fatigue, low-cycle fatigue or high-cycle fatigue), edge-of-contact damage between stationary parts, oxidation or hot corrosion of high-temperature metallic sections, static seal degradation, guide vane sidewall distress, and blade platform distress.

During service intervals, the turbines are at least partially disassembled to allow repair and/or replacement of damaged components. Currently, damaged components of turbine engines are primarily repaired at overhaul facilities, with only limited intervention conducted in the field. The processes used to repair compressor and turbine flowpath components may include surface cleaning so as to remove accumulated dirt and oxidation products, stripping and restoration of coated surfaces, crack repair, section replacement, aero contouring and smoothing. Although the cost of the unit processes is typically lower than the replacement cost of the damaged components, forced outages are costly and disruptive to the engine operator. Consequently, conventional methods of maintaining turbines using periodic inspections and factory-based component repair methods may sometimes result in unplanned outages caused by a small number of heavily distressed components and will run some fraction of components beyond their repair limits.

To address the above described disadvantages, there have been disclosures of in situ methods of repairing a damaged component, such as an abradable coating (e.g., U.S. Pat. Nos. 7,509,735, 8,563,080, U.S. Patent Application Publication No. 2015/0174837). However, these prior disclosures are focused on borescope-type access using tethered tools. These tethered tools are severely limited for the purpose of maintenance because they can access only limited locations within the turbine. Furthermore, even if a damaged area can be reached with a tethered tool, the angle of access to a damaged area may be disadvantageous for performance of a repair task. In extreme cases, the tether may even become jammed or severed, leaving the tool stranded inside of the gas turbine engine. An untethered maintenance apparatus would not have such limitations. An untethered inspection device is disclosed in U.S. Pat. No. 8,400,501 but the disclosed apparatus is not intended for and is not capable of performing repairs.

Accordingly, the present invention seeks to provide a novel method of maintaining turbine assemblies which overcomes the above-mentioned problems by using a remotely controlled maintenance apparatus capable of performing repairs.

SUMMARY OF THE INVENTION

One object of the present invention is to provide methods for maintaining turbine assemblies, such as gas turbine engines. The maintenance may include inspection of internal parts of a turbine assembly. The maintenance may also include repair of damaged internal parts of a turbine assembly, including shrouds, blades and guide vanes.

Accordingly, in one embodiment, the invention is directed to a method for maintenance of a turbine assembly, the turbine assembly including a rotor and a stator, the stator including a damaged region, the method including: disposing a remotely controllable maintenance apparatus on the rotor; positioning the maintenance apparatus proximate to the damaged region by rotating the rotor; and repairing the damaged region by operating a repair tool disposed on the apparatus.

In another embodiment, the invention is directed to a method for maintenance of a turbine assembly, the turbine assembly including a rotor and a stator, the rotor including a damaged region, the method including: disposing a remotely controllable maintenance apparatus on the stator; positioning the damaged region proximate to the maintenance apparatus by rotating the rotor; and repairing the damaged region by operating a repair tool disposed on the apparatus.

The methods disclosed herein are advantageous because they can be performed without dismantling or removing components that need to be maintained. These and additional features provided by the embodiments discussed herein will be more fully understood in view of the following detailed description, in conjunction with the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
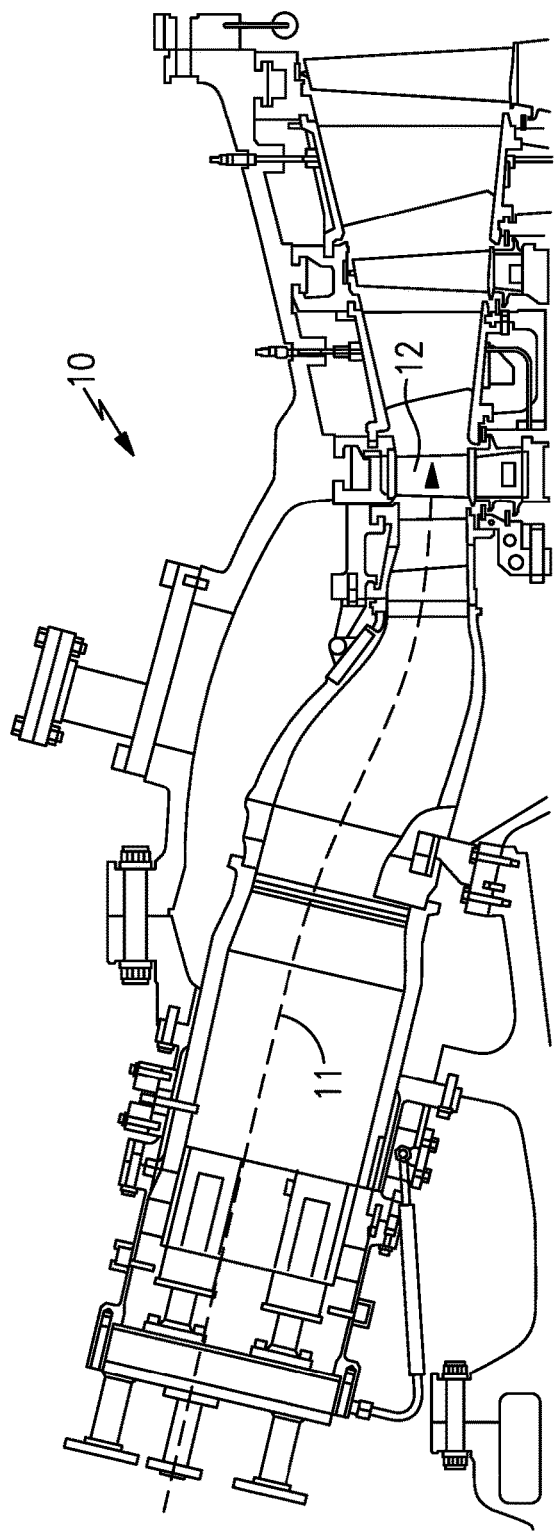
FIG. 1 provides an idealized cross-sectional view of a turbine assembly, depicting an example of an insertion path of the maintenance apparatus into the hot gas path of the turbine section through the combustion hardware.

In the following specification and the claims which follow, reference will be made to a number of terms, which shall be defined to have the following meanings.

The singular forms "a", "an", and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

As used herein, the term "maintenance" refers to tasks associated with maintaining the condition of components of a turbine assembly. The advantages of such maintenance include the efficient operation of a turbine assembly, reduction of risk of unplanned outages, and increase in repairability of components of a turbine assembly during a subsequent overhaul. Therefore, maintenance includes inspection of the turbine assembly components to identify, assess and document degradation and damage. Maintenance also includes any tasks associated with servicing of the degraded or damaged areas, such as, for example, cleaning and/or repair. Maintenance also includes non-destructive testing.

As used herein, the term "rotor" refers to moving components of a turbine assembly and includes blades.

As used herein, the term "adjacent blades" refers to any blades that are positioned next to each other in the rotor.

As used herein, the term "stator" refers to non-rotating components of a turbine assembly. Accordingly, the term "stator" encompasses shrouds, guide vanes, and any other components not attached to the rotor.

As used herein, the term "adjacent guide vanes" refers to any guide vanes that are positioned next to each other.

As used herein, the term "camera" refers to any device operable to take an image, such as a still image, rows of line-scanner image data, three dimensional images or streams of images, including live streaming or video recordings. As intended here, an image can be an optical image, such as one obtained with a visible light camera and white light illumination. Alternatively, the illumination can include IR and/or UV, and the collected image can be multi- or hyper-spectral. In yet other embodiments, the camera can be sensitive to specific luminescence, such as from fluorescent penetrant fluid applied to the components prior to imaging. In yet another embodiment, the camera can create three dimensional images or models from range sensitive tactile, acoustic and laser sensing devices or stereo imagers or monocular imagers coupled with platform motion. The camera is disposed on the apparatus and operable to transmit visual data to a remote receiver that is connected to the camera by wire or wirelessly. The remote receiver may be, for example, a display monitor or a recording device. The visual data may also be stored on a data storage device incorporated into the maintenance apparatus or the camera. The camera may be operable to adjust its orientation on the apparatus so as to be able to bring different areas within its field of view. The camera may further be operable to adjust its focus. For example, when the apparatus is disposed on the rotor (for example, between adjacent blades), the camera may be operable to adjust its orientation and/or focus so as to image the shroud or guide vanes and stationary seals. Similarly, for example, when the apparatus is disposed on the stator (for example, between adjacent guide vanes), the camera may adjust its orientation and/or focus so as to view parts of the rotor positioned within line of sight of the camera, such as, for example, the blades and inter-blade seals and dampers. Additionally, the camera may be positioned in such a way that the maintenance apparatus (including its mobility mechanism, its anchoring mechanism, and its repair mechanism) is viewable to provide state information to an operator or automatic control system.

The camera may be operable to move on the apparatus to change its position. Such moving of the camera can be achieved by any means known in the art, such as motor-driven serial- and parallel-link manipulators, wheels, track-driven carriages, screws and pistons. The motor could be of any type known in the art. Some examples of suitable motor types are an electric motor, a hydraulic motor, and a pneumatic motor.

As used herein, the term "rotating the rotor" refers to any rotational movement of the rotor and, therefore, denotes a complete 360 degree revolution of the rotor and/or a partial revolution that is less than 360 degrees, and/or a revolution that is greater than 360 degrees. The term "rotating the rotor" also encompasses multiple revolutions of the rotor. Therefore, multiple rotating steps are within the scope of the invention. Each rotating step may be performed as an uninterrupted continuous motion or with one or more stops. The direction of each rotating step may be the same or it may be reversed.

As used herein, the term "anchoring the apparatus" or "anchoring mechanism" refers to any means for fixing the position of the apparatus within its local environment in the turbine. For example, the apparatus may be anchored by applying outward clamping forces to lock the maintenance apparatus between adjacent blades or guide vanes, or by exerting clamping forces against the blade platform and/or shroud. Additionally, for example, the maintenance apparatus may at least partially surround a single blade or guide vane and provide an inward clamping force to anchor it in place. In still another exemplary embodiment, the maintenance apparatus may clamp onto adjacent airfoils (i.e., adjacent blades or adjacent guide vanes), with the apparatus positioned in between the adjacent airfoils. Alternatively, the maintenance apparatus can be positioned forward or aft of the airfoils, whilst not hindering the rotation of the rotor. Inward and outward clamping forces may be created through the use of spacers, retractors or clamps driven by screws, springs, electric motors, permanent magnets, electromagnets, shape memory alloys, electro-active polymers, pneumatics, hydraulics, expanding foams, or elastomers.

As used herein, the term "damaged region" refers to any deposit or damage on a surface of a stator or a rotor. For example, such damaged region may be a result of fouling (e.g., by dust accumulation, oxidation, and/or corrosion products), coating spallation, oxidation, corrosion, erosion, impact, wear, or cracking.

As used herein, the term "repairing the damaged region" refers to any one or more actions that partially or fully repair the damaged region.

As used herein, the term "thermal barrier coating" or "TBC" refers to known in the art ceramic coatings applied to metallic and ceramic substrates, such as on gas turbine or aero-engine parts, operating at elevated temperatures, as a form of heat management.

As used herein, the term "environmental barrier coating" or "EBC" refers to known in the art ceramic coatings used to protect components, and especially silicon-containing materials, from harsh operating conditions, such as hot combustion gases.

As used herein, the term "repair material" refers to a composition that may be used to patch damaged area of a TBC or EBC. Such compositions are known the art, for example, TBC repair materials are disclosed in U.S. Pat. Nos. 6,413,578, 6,827,969, 6,875,464, 6,890,587, and 7,476,703. EBC repair materials are disclosed, for example, in U.S. Patent Application Publication No. 2015/0175486. An example of commercially available repair composition for TBC repair is known in the art under the tradename CERCOTEC.

As used herein, the terms "remote transmission", "remotely transmit", and similar terms refer to a system wherein a sender of the data transmission and a receiver of the data transmission are spatially separated from each other, and wherein the transmission is sent via a wired or a wireless connection.

Transmitted data can include visual data (e.g., from a camera sensor), state data (e.g., apparatus location information, repair mechanism position, camera position, motor currents), and control data (e.g., commands to move repair mechanism, commands to move camera, commands to change camera settings).

As used herein, the terms "remotely controllable", "remote control", and similar terms refer to a system wherein the controller and object being controlled are spatially separated from each other, and wherein the control is achieved via a wired or a wireless connection.

In one embodiment, the invention is directed to a method for maintenance of a turbine assembly, the turbine assembly including a rotor and a stator, the stator including a damaged region, the method including: disposing a remotely controllable maintenance apparatus on the rotor; positioning the maintenance apparatus proximate to the damaged region by rotating the rotor; and repairing the damaged region by operating a repair tool disposed on the apparatus. In one embodiment, a camera is disposed on the apparatus, wherein the camera is operable to remotely transmit visual data to a receiver. Such remote transmission may be done through a wired connection or wirelessly. Thus, in one embodiment, a camera is disposed on the apparatus, wherein the camera is operable to wirelessly transmit visual data to a receiver.

Disposing of the apparatus could be performed with use of an insertion device. One end of the insertion device could be secured to the apparatus and inserted into the turbine assembly, such as, for example, through the turbine inlet, turbine exhaust, steam inlet, borescope port, igniter port, instrument port, or combustion gas path. The insertion device would then detach from the apparatus, leaving the apparatus inside of the turbine assembly. Non-limiting examples of insertion devices include guide tubes that hold the apparatus using mechanical means such as hooks, grippers, latches, magnets, or threaded couplings. Insertion device deposits the apparatus in the desired location within the turbine assembly and releases the apparatus. Another approach of disposing the apparatus could be performed with an apparatus that includes a self-ambulation mechanism (i.e., a mobility mechanism) allowing it to travel through the turbine, traversing axially and/or radially from an ingress point to a desired stator or rotor location, via intermediate stator or rotor components.

In one embodiment of the methods described herein, visual data is wirelessly transmitted from the camera to a receiver and, optionally, data regarding repair tool and camera position and configuration parameters may be wirelessly transmitted to a receiver. Additionally, control data can be wirelessly transmitted to the camera or repair tool. Examples of control data include instructions to change camera position, repair tool position, and camera configuration parameters. Such wireless transmitting can be achieved by means well known in the art. For example, known means of wireless transmission include radio frequency communication protocols (e.g., Analog Video, Digital Video, WiFi, Bluetooth, wireless-serial) and light communication protocols (e.g., LiFi).

In one embodiment, the methods described herein further include anchoring the apparatus subsequent to disposing of the apparatus. Such anchoring can be achieved by means discussed above.

In one embodiment, operating the repair tool (i.e., repair mechanism) includes remotely transmitting a control signal to the apparatus. Such remote transmission may be done through a wired connection or wirelessly. Thus, in one embodiment, operating the repair tool includes wirelessly transmitting a control signal to the apparatus. Transmission of the control signal can be performed by any means known in the art, such as those described above for wireless visual data transmission.

The operating of the repair tool may also include moving the repair tool on the apparatus. Such moving may include moving the repair tool relative to the damaged region. Moving of the repair tool can be achieved by any means known in the art, such as motor-driven serial- and parallel-link manipulators, wheels, track-driven carriages, screws and pistons. The motor could be of any type known in the art. Some examples of suitable motor types are an electric motor, a hydraulic motor, and a pneumatic motor.

Operating the repair tool may include disposing a repair material onto the damaged region. Accordingly, in some embodiments, the repair tool may be a device operable to dispense a metered portion of repair material or to place a pre-metered portion of repair material to fill a defect and smooth the material so as to make the repair surface substantially flush with non-repaired surfaces of the same component. Such repairs may be applicable, for example, to patching of missing thermal barrier or environmental barrier coatings, or to repairing cavities in ceramic matrix composites. Such repair tool may be disposed on the apparatus via one or more articulating and/or telescoping arms or tool carriages.

The operating of the repair tool may also include removing material from the damaged region. This can be used to remove surface deposits (e.g., molten dust, hydrocarbon decomposition products), oxidation/corrosion products, cracked material or deformed material (e.g., compressor leading edge burrs). Non-limiting examples of repair tools that remove material include abrasive tools (e.g., rotary grinding wheels and bits, abrasive scrubbers, sand blasters), cutting tools (e.g., laser cutters, cut-off wheels, mill tools), chemical cleaning tools (e.g., solvent cleaners, detergents, acidic cleaners, basic cleaners), electrochemical tools, electrodischarge tools, waterjets, and combinations thereof.

In some embodiments, the damaged region may be a crack and repairing the damaged region would then include repairing the crack. Methods for repairing a crack would include preparing the crack surfaces for repair (e.g., by cleaning or grinding the area to be repaired), and executing a weld or braze repair. In the case of weld repair, a small metal inert gas (MIG), tungsten inert gas (TIG), shielded metal arc, or flux core arc welding torch can be used in conjunction with a weld repair feed wire or stick. In the case of braze repair, a braze paste is dispensed using the repair tool. The braze paste is subsequently heated in a substantially non-oxidizing environment so as to melt the braze material and allow it to flow into the crack surfaces. Heating in a substantially non-oxidizing environment can include use of an inert shielding gas and/or a chemical fluxing agent in conjunction with application of the heat source. The heat source can comprise a laser source, a radiant/convective source (e.g., IR lamp or electric heating element), an inert gas plasma torch, or an exothermic reaction source (e.g., self-propagating high temperature synthesis source).

When the maintenance task is completed, the apparatus may be removed from the turbine assembly. Thus, the methods described herein may further include a step of removing the apparatus from the turbine assembly. The apparatus may be removed using an extraction device. In one embodiment, the extraction device is the same as the insertion device. In another embodiment, the extraction device is distinct from the insertion device. Non-limiting examples of extraction devices include hooks, latches, magnets, threaded couplings or grippers that are inserted along the same path as the apparatus, attach to an extraction feature of the apparatus, and are pulled so as to extract the apparatus from the turbine assembly. In an alternative embodiment, a self-ambulating apparatus may traverse, under its own power, to egress the turbine through the inlet, exhaust, or any other route, including, for example, its ingress route.

Figure 2:
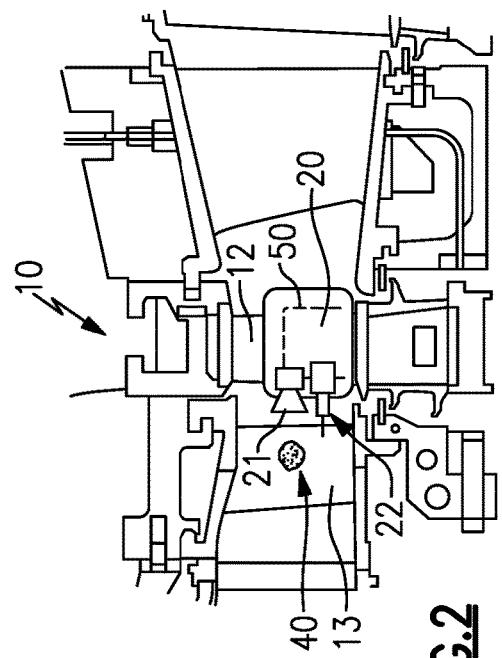
FIG. 2 provides an enlarged idealized cross-sectional view of a section of turbine assembly, showing an idealized depiction of the maintenance apparatus disposed between adjacent blades of the rotor.
Figure 5:
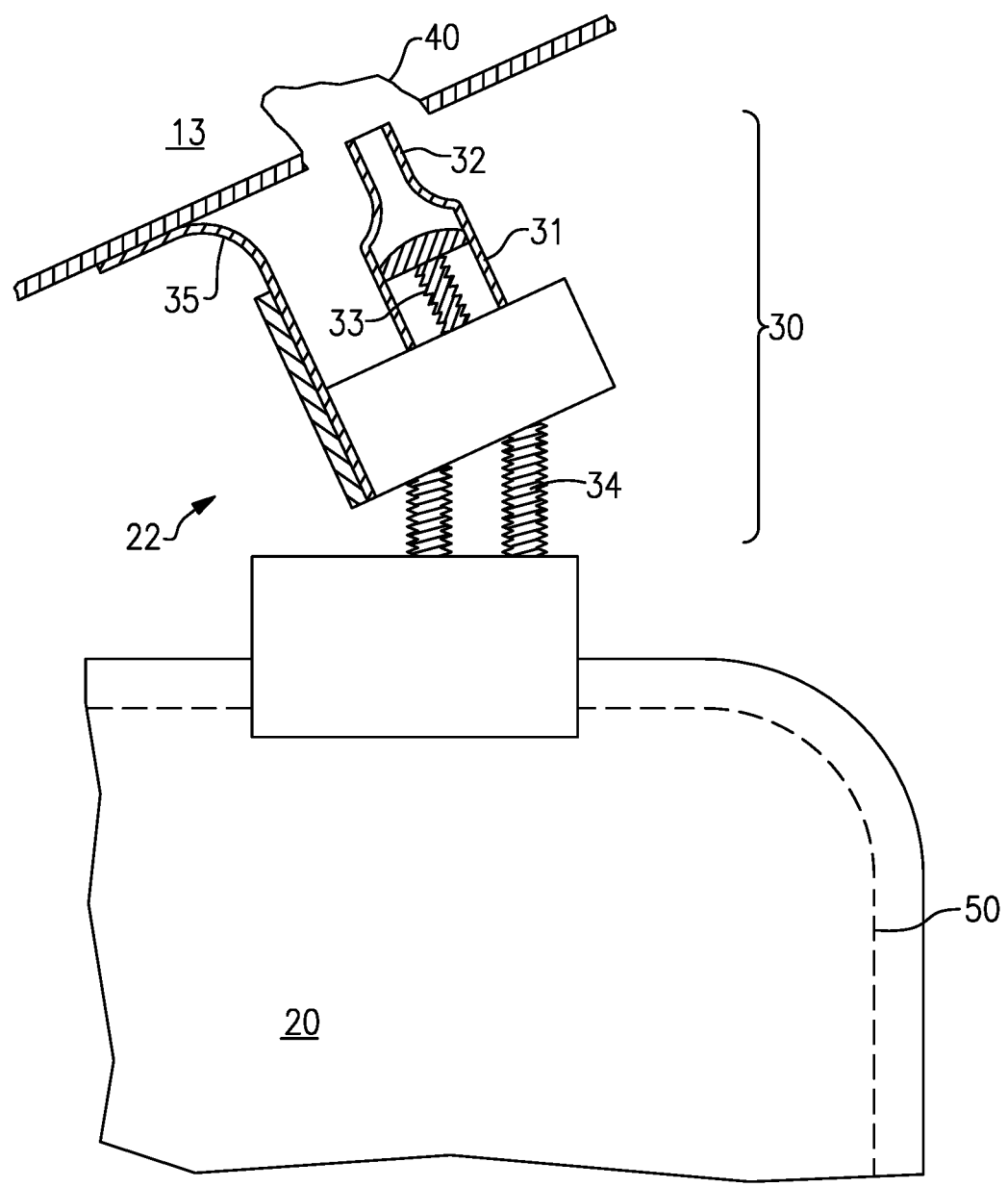
FIG. 5 provides an idealized view of a repair tool.

An embodiment of the above described methods is depicted in FIGS. 1 and 2. FIG. 1 depicts an idealized cross-sectional view of a turbine assembly 10, showing an example of an insertion path 11 of a maintenance apparatus 20. FIG. 2 depicts an enlarged idealized cross-sectional view of a turbine assembly 10, showing an idealized depiction of the maintenance apparatus 20 disposed between adjacent blades of a rotor 12. The maintenance apparatus 20 may be inserted into the turbine assembly 10 with a suitably designed insertion device. Such insertion device would release the maintenance apparatus 20 once it is disposed between adjacent blades of a rotor 12. The term "release," as it is used here, means that the insertion device may mechanically decouple from the maintenance apparatus to allow the insertion device to avoid mechanical interference with moving turbine parts. After release, a tether may or may not remain connecting the insertion device to the maintenance apparatus. If a tether is used, its size, shape and compliance are selected such that it does not create mechanical interference to rotating turbine parts. Next, the maintenance apparatus 20 is positioned proximate to (i.e., near) a damaged region 40 located on the stator 13. This is achieved by rotating the rotor 12 and positioning the maintenance apparatus 20, which is disposed on the rotor 12, such that the repair tool 22 is located proximate to the damaged region 40 on the stator 13. Both the camera 21 and a repair tool 22 may be able to move on the apparatus 20, for example, along the dashed line 50. The repair tool 22 disposed on the maintenance apparatus 20 is then used to repair the damaged region 40. A camera 21 disposed on the maintenance apparatus 20 may be used to view the damaged region 40 and the repair process. In one exemplary embodiment, illustrated in FIG. 5, repair tool 22 includes a ceramic patch application system 30, which includes a patch slurry reservoir 31, a patch slurry dispensing tip 32, a mechanical positioner 34 to move the dispensing tip 32 proximate a damaged region 40, a mechanical dispense actuator 33 to transport the patch slurry from the reservoir 31 to the damaged region 40 via the dispensing tip 32, and a mechanical wiper 35 to level the patch slurry over the damaged region 40.

In another embodiment, the invention is directed to a method for maintenance of a turbine assembly, the turbine assembly including a rotor and a stator, the rotor including a damaged region, the method including: disposing a remotely controllable maintenance apparatus on the stator; positioning the damaged region proximate to the maintenance apparatus by rotating the rotor; and repairing the damaged region by operating a repair tool disposed on the apparatus. In one embodiment, a camera is disposed on the apparatus, wherein the camera is operable to remotely transmit visual data to a receiver. Such remote transmission may be done through a wired connection or wirelessly. Thus, in one embodiment, a camera is disposed on the apparatus, wherein the camera is operable to wirelessly transmit visual data to a receiver.

In one embodiment of the methods described herein, visual data is wirelessly transmitted from the camera to a receiver and, optionally, data regarding repair tool and camera position and configuration parameters may be wirelessly transmitted to a receiver. Additionally, control data can be wirelessly transmitted to the camera or repair tool. Examples of control data include instructions to change camera position, repair tool position, and camera configuration parameters.

In one embodiment, the methods described herein further include anchoring the apparatus subsequent to disposing of the apparatus. Such anchoring can be achieved by means discussed above.

In one embodiment, operating the repair tool includes remotely transmitting a control signal to the apparatus. Such remote transmission may be done through a wired connection or wirelessly. Thus, in one embodiment, operating the repair tool includes wirelessly transmitting a control signal to the apparatus.

The operating of the repair tool may also include removing material from the damaged region.

The repair tool could also be used to repair the damaged region. In one embodiment, operating the repair tool includes disposing a repair material on the damaged region. The operating of the repair tool may also include moving the repair tool on the apparatus. The damaged region may be a crack and repairing the damaged region would then include repairing the crack.

When the maintenance task is completed, the apparatus may be removed from the turbine assembly. Thus, the methods described herein may further include a step of removing the apparatus from the turbine assembly.

Figure 3:
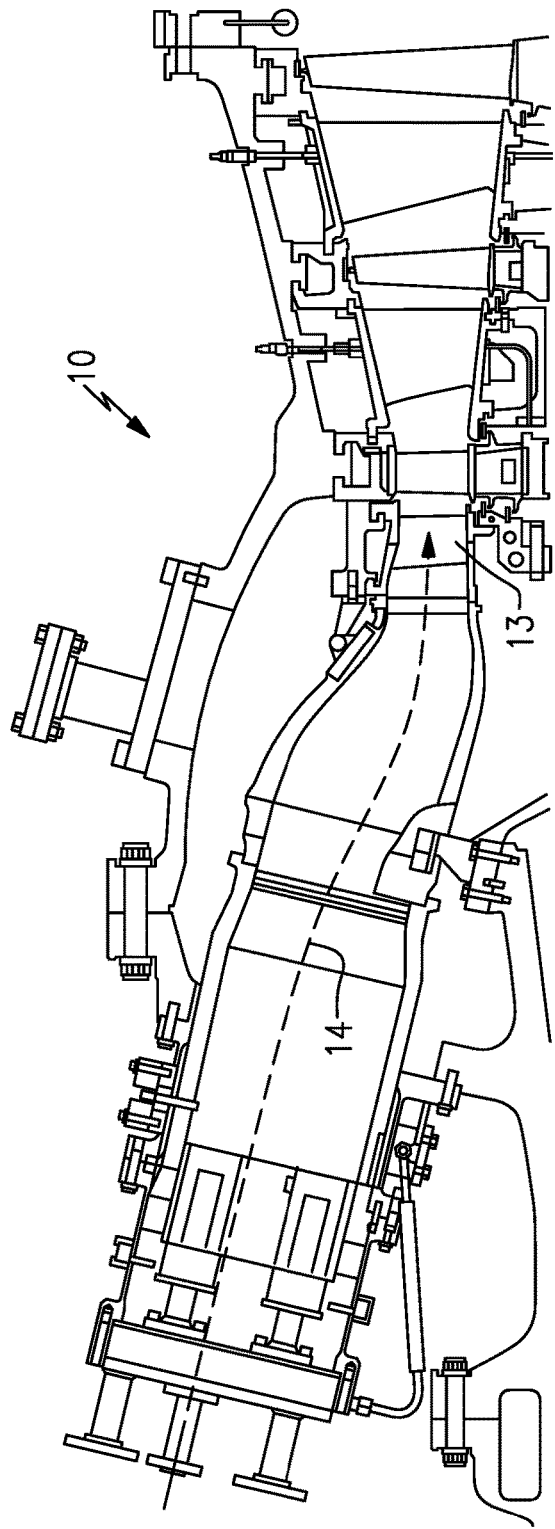
FIG. 3 provides an idealized cross-sectional view of a turbine assembly, depicting another example of an insertion path of the maintenance apparatus into the hot gas path of the turbine section through the combustion hardware.
Figure 4:
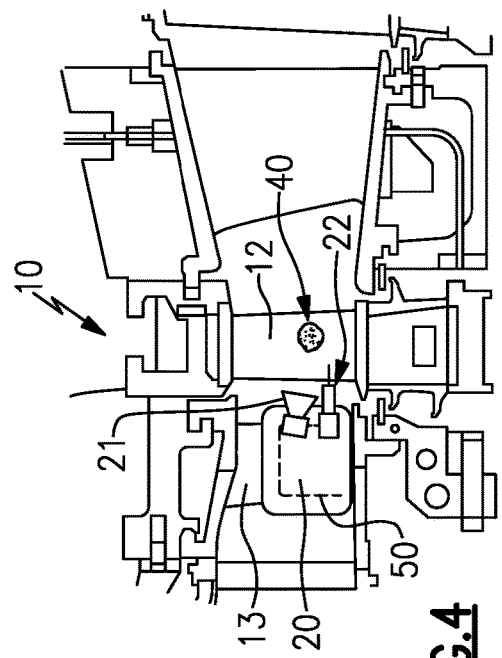
FIG. 4 provides an enlarged idealized cross-sectional view of a section of turbine assembly, showing an idealized depiction of the maintenance apparatus disposed between adjacent guide vanes of a stator.

An embodiment of the above described methods is depicted in FIGS. 3 and 4. FIG. 3 depicts an idealized cross-sectional view of a turbine assembly 10, showing an example of an insertion path 14 of the maintenance apparatus 20. FIG. 4 depicts an enlarged idealized cross-sectional view of the turbine assembly 10, showing an idealized depiction of the maintenance apparatus 20 disposed between adjacent guide vanes of a stator 13. The maintenance apparatus 20 may be inserted into the turbine assembly 10 with a suitably designed insertion device. Such insertion device would release the maintenance apparatus 20 once it is disposed between adjacent guide vanes of a stator 13. The maintenance apparatus 20 may be placed between any selected adjacent guide vanes. Next, the maintenance apparatus 20 is positioned proximate to (i.e., near) a damaged region 40 located on the rotor 12. This is achieved by rotating the rotor 12 and positioning the maintenance apparatus 20, which is disposed on the stator 13, such that the repair tool 22 is located proximate the damaged region 40 on the rotor 12. Both the camera 21 and the repair tool 22 may be able to move on the apparatus 20, for example, along the dashed line 50. The repair tool 22 disposed on the maintenance apparatus 20 is then used to repair the damaged region 40. A camera 21 disposed on the maintenance apparatus 20 may be used to view the damaged region 40 and the repair process. The repair tool may be the same as the exemplary repair tool 22 shown in FIG. 5 and discussed above. This repair tool 22 may be used to apply a patch slurry to a damaged region 40 on the rotor 12.

Throughout this application, various references are referred to. The disclosures of these publications in their entireties are hereby incorporated by reference as if written herein.

While only certain features of the invention have been illustrated and described herein, many modifications and changes will occur to those skilled in the art. It is, therefore, to be understood that the appended claims are intended to cover all such modifications and changes as falling within the true spirit of the invention.

What is claimed is:

1. A method for maintenance of a turbine assembly, the turbine assembly comprising a rotor and a stator, the stator comprising a damaged region, the method comprising:

anchoring a remotely controllable maintenance apparatus on the rotor;

rotating the rotor to position the maintenance apparatus proximate to the damaged region; and thereafter, operating and moving a repair tool along the maintenance apparatus and relative to the damaged region so as to repair the damaged region, wherein operating the repair tool comprises disposing a repair material on the damaged region.

2. The method of claim 1, wherein a camera is disposed on the apparatus, wherein the camera is operable to remotely transmit visual data to a receiver.

3. The method of claim 2, wherein the camera is operable to wirelessly transmit visual data to a receiver.

4. The method of claim 1, wherein the maintenance apparatus is anchored between the adjacent blades of the rotor subsequent to disposing of the apparatus.

5. The method of claim 1, wherein operating the repair tool comprises remotely transmitting a control signal to the apparatus.

6. The method of claim 5, wherein operating the repair tool comprises wirelessly transmitting a control signal to the apparatus.

7. The method of claim 1, wherein operating the repair tool comprises removing material from the damaged region.

8. The method of claim 1, wherein the damaged region is a crack and repairing the damaged region comprises repairing the crack.

9. The method of claim 1, further comprising removing the apparatus from the turbine assembly.

\* \* \* \* \*